United States Patent Office 2,814,011
Patented Nov. 19, 1957

2,814,011

REMOTE CONTROL APPARATUS FOR ELECTRIC MOTORS AND OTHER MACHINES

Michel Cremer, Paris, France, assignor to Forges et Ateliers de Constructions Electriques de Jeumont, Paris, France, a corporation of France Application January 23, 1957, Serial No. 635,716

Claims priority, application France January 31, 1956

6 Claims. (Cl. 318—314)

This invention relates to means for the remote control of electric motors or other machines, as a function of two current frequencies.

The principal object of the invention is to provide means for remote control of electric motors and other machines, in which the operation is defined on the one hand by a reference frequency, which is for example proportional to the desired speed of the controlled motor or machine, and on the other hand by another frequency which is for example proportional to the actual speed of the motor or machine.

Another object of the invention is to provide for ensuring the correct operation of the remote control means, whatever be the ratio of the two frequencies and irrespective of their absolute values, which must often be capable of very substantial variation.

According to the invention, the remote control means is subject to two current frequencies, one being a reference frequency transmitted from a distance and representing a desired value in the operation of the motor or machine controlled, and the other frequency produced locally being variable according to the actual working of the motor or machine controlled. The first or reference frequency may be used to initiate the charging of a condenser by periodical variable current impulses, and the other frequency used to initiate periodically partial discharges of the same condenser. The resultant voltage of the condenser, defined by the varying ratio of the two frequencies, can be used to control the operation of the motor or machine, preferably under conditions of safety, for the purpose of bringing about or maintaining the desired relationship of the two frequencies.

Other objects, features and advantages of the invention will be understood from the following description and claims in conjunction with the accompanying drawings which illustrate by way of example, a preferred embodiment of the apparatus and in which:

Figure 1:
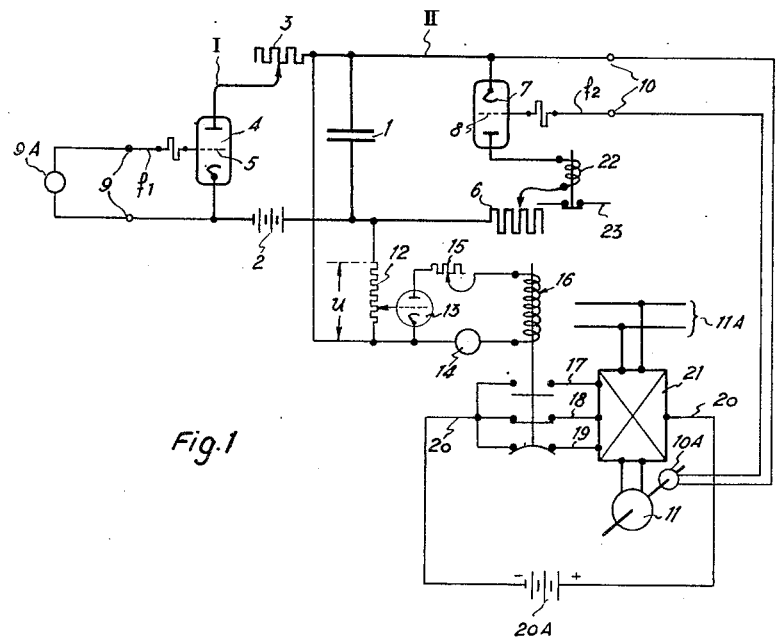
Fig. 1 is a simplified circuit diagram in accordance with the invention.

Referring to Fig. 1 which is a simplified circuit diagram, showing a condenser 1, across the terminals of which there is connected a charging circuit I comprising a current source 2, connected in series with a regulating impedance such as a variable resistance 3 and a switching device 4. The latter is represented in the form of a suitable electronic valve provided with a control electrode or grid 5.

A circuit II for effecting partial discharge of the condenser 1 is constituted by a variable impedance or resistance 6 and a switching device 7, similar to the previous one and provided with a control electrode or grid 8.

Across the control terminals 9 of the valve 4 there is applied an alternating or pulsatory voltage having the frequency $f_1$ and herein referred to as a reference voltage, which has the effect of controlling the valve 4 for supplying to the condenser 1 periodical current impulses which partially charge it progressively at the frequency $f_1$. This reference voltage can be produced for instance by a suitably adjustable alternator 9A. In a similar way there is applied across the control terminals 10 of the valve 8 an alternating or pulsatory voltage having the frequency $f_2$, this frequency being for example proportional to the speed of a moving body driven by a motor 11 which is to be controlled. The motor 11 is supplied with current by a network 11A. The speed-proportional voltage having the frequency $f_2$ may be produced by a small tachymetric generator 10A driven by the motor 11 and connected as shown to terminals 10.

If the two frequencies $f_1$ and $f_2$ are equal to one another, as well as the durations of the impulses and the resistances 3 and 6 of the charging and discharging circuits, it will be found that a resultant average voltage U of the condenser 1 is obtained at approximately 50% of the voltage supplied by the source 2. This equilibrium does not only depend upon the absolute values of the two frequencies, but it also depends upon the adjustment of the resistances 3 and 6. It is therefore possible either to modify the resultant average condenser voltage U by regulating these resistances, or to obtain the resultant voltage of approximately 50% for any ratio of the two frequencies.

If, once this equilibrium is established, the reference frequency $f_1$ is increased, the resultant average voltage U across the terminals of the condenser 1 increases, and if $f_1$ decreases, this voltage drops. In other words the resultant average voltage U is a definite function of the ratio $f_1 : f_2$.

The voltage U can be applied as represented to a high-resistance potentiometer 12 connected as shown, and an appropriate fraction of the voltage U can be tapped off to bias the control grid of a triode 13 which is connected in series with a current source 14 and a resistance 15 to feed a motor-control relay 16. The current passing through relay 16 will then be a function of the selected fraction of the voltage U.

The armature of the relay 16 can actuate a plurality of movable elastic contacts for closing connections 17, 18, 19 of a control circuit 20 energized by a source 20A and associated with suitable motor control equipment 21 for starting, speed-regulation and braking of the motor 11.

It is possible for example to arrange the system so that the relay 16 occupies the intermediate position represented, so long as the voltage U has a certain intermediate value. In this position, the lines 18 and 19 receive current and the line 17 is disconnected; the equipment 21 which will be described in detail later herein, is arranged to remain inactive in this case, and the running of the controlled motor 11 is unchanged.

If the speed of the motor 11 is too low, that is to say the frequency $f_2$ is too low in relation to $f_1$, the voltage U increases, the armature of 16 rises and all the lines 17, 18 and 19 receive current, which has the effect of causing the equipment 21 to accelerate the motor 11 progressively until equilibrium of the charges and discharges of the condenser 1 is again obtained. If the speed of the motor is slightly greater than the desired value indicated by $f_1$, the line 18 is deenergized and the equipment 21 reduces the speed a little. If the speed of the motor 11 is substantially greater than the value desired, all the lines 17, 18 and 19 are deenergized at once, the equipment 21 being arranged to produce, in this case, a rapid deceleration and emergency braking of the motor, if necessary.

Figure 2:
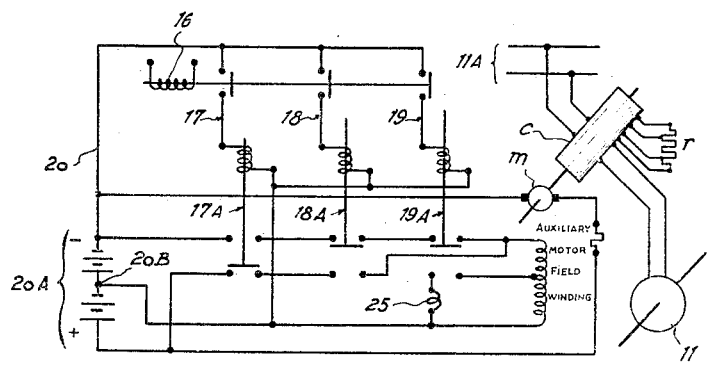
Fig. 2 is a schematic diagram of the motor control equipment shown in Fig. 1.

An embodiment of motor control means 21 is shown schematically in Fig. 2. The connections or lines 17, 18 and 19 are connected to energize three corresponding relays 17A, 18A and 19A from a source of current, as for example, a battery 20A. The coils of the three relays are connected in series with the armature of a small auxiliary motor $m$. The auxiliary motor $m$ is adapted to drive or rotate in either direction a controller C, which in cooperation with suitable resistors $r$ controls the main or controlled motor 11. The field windings of the small or auxiliary motor $m$ are connected, as shown, to the contacts of the three relays and to the center tap 20B of current source 20A. It will be understood that for purpose of simplifying the diagram only one motor 11 is shown but a plurality of motors could be thus connected so as to be controlled in similar manner.

When relay 16 is in the position shown in Fig. 2, corresponding to the position in Fig. 1, the armature of the motor $m$ is energized by its normal operating current limited by means of a suitable resistor as shown. However, the auxiliary motor's field windings are not excited so that motor $m$ does not rotate. If control relay 16 closes its proper contacts so as to energize relay 17A the latter relay closes its upper contacts and the auxiliary motor field winding receives its full excitation so that controller C rotates in a direction effecting the acceleration of the motor 11 which is being controlled. If only relay 19A is energized the lower contacts of relays 17A and 18A are closed and the field winding is energized in an opposite direction from the lower part of the current source 20A so that the controller C is made to rotate in a direction for reducing the speed of the motor 11. If all the three relays 17A, 18A and 19A are deenergized by control relay 16 the lower portion of the auxiliary motor field winding is short circuited so that motor $m$ rotates rapidly in the direction for decelerating the controlled motor 11.

A coil 25 may be connected in series with the lower contacts of relay 19A, as shown in Fig. 2, so that when relay 19A is deenergized coil 25 is energized and actuates a brake, not shown, so as to quickly stop the motor 11.

Thus it can be seen that the speed of the controlled motor or motors is regulated according to the ratio between the reference frequency $f_1$, transmitted from a distance and defining the desired motor speed, and the frequency $f_2$ which is produced locally as a measure of the actual speed of the motor or motors. It will be understood that the desired ratio of the two frequencies may vary widely and that it can easily be adapted to the various conditions of operation and more particularly to the desired ranges of motor speed.

In order that the operation of the remote-control means described may take place with all desired security, it is sufficient to connect in series with the switching apparatus or valve 7 a relay 22 with delayed drop, controlling a safety circuit 23. If for any reason the discharges of the condenser 1 are interrupted, this relay breaks the circuit 23, causing the emergency stopping of the controlled motor or motors. As regards all other elements of the remote-control means, it is to be observed that any failure in their operation acts in the direction of safety.

It will be understood that the accompanying diagrams may involve departures from the described embodiment as well known in the art of applied electronics, especially as regards the valves 4, 7 and 13 and their control and regulation circuits.

Moreover, it will be understood by those skilled in the art that the frequencies $f_1$ and $f_2$ may represent various values or magnitudes other than speed; for example one of them may be defined by a pump delivery and the other by the pumping pressure, one by an electric current and the other by the voltage, and so on.

What I claim and desire to secure by Letters Patent is:

1. In an electrical remote control apparatus for controlling a machine by two electrical frequencies, in combination, capacitance means, means connected for periodically partially charging said capacitance means at a desired reference frequency comprising a charging circuit having a source of electric power, a first adjustable impedance means and a first switching means controlled to close the charging circuit at said reference frequency, means connected for periodically partially discharging said capacitance means at a second frequency which is proportional to a variable magnitude characterizing the operation of the machine, said discharging means comprising a discharging circuit having a second adjustable impedance means and a second switching means controlled to close the discharging circuit at said second frequency, whereby the resultant average voltage of said capacitance means is a function of the ratio between said two frequencies, and voltage responsive means connected to respond to said resultant voltage for controlling said variable magnitude of the machine.

2. Apparatus according to claim 1, in which said source of electric power in said charging circuit comprises a source of direct current and in which said first adjustable impedance means comprises an adjustable resistance and said first switching means comprises an electronic valve connected to respond to said reference frequency for controlling the periodical charging of said capacitance means from said current source.

3. Apparatus according to claim 1, in which said second impedance means in said discharging circuit comprises an adjustable resistance and in which said second switching means comprises an electronic valve connected to respond to said second frequency for controlling the discharges of said capacitance means.

4. Apparatus according to claim 1, in which said voltage-responsive means comprises a high resistance potentiometer connected across said capacitance means, a source of current, a triode operably connected to said potentiometer and a current-responsive relay having a plurality of operative positions, said relay being connected to control said variable magnitude of the machine.

5. A frequency comparator for controlling a machine comprising, capacitance means, a charging circuit connected to said capacitance means and comprising means for impressing periodically a predetermined charging voltage on the capacitance means by closing periodically the charging circuit at a predetermined reference frequency, the reference frequency defining a selected value of an operational magnitude of the machine, a discharging circuit comprising means connected to initiate periodically the discharge of said capacitance means at a frequency corresponding to the actual value of said operational magnitude of the machine, variable means connected for adjusting the current in each of said circuits for obtaining a selected ratio between the reference frequency and the discharge initiating frequency and a selected corresponding value of an average resultant voltage of said capacitance means, means for selectively controlling said operational magnitude of the machine, current-responsive means for selectively actuating said last mentioned means, a source of current for energizing said current-responsive means, voltage-responsive valve means connected to control the current to said current-responsive means, said valve means being connected to respond to said resultant voltage from said capacitance means.

6. In an electrical remote control apparatus for controlling a motor, in combination capacitance means, means comprising a circuit connected for partially charging said capacitance means periodically with a current flowing at a selected voltage, means for closing said charging circuit at a predetermined reference frequency defining a selected operational speed of the motor to be controlled, means connected for providing a current for partially discharging said capacitance means periodically, at a frequency directly proportional to the actual speed of the motor, means for varying the total impedances of said means for charging the capacitance means and of the means for discharging said capacitance means and adjusting a ratio between said reference and speed-proportional frequencies and a corresponding predetermined average resultant voltage of the capacitance means, means for selectively controlling the operational speed of the motor by the variations of said ratio, said motor speed control means being adapted to permit said motor to operate at said selected speed when said predetermined resultant voltage obtains, and to accelerate the motor when the resultant voltage increases and to decelerate the motor when the resultant voltage decreases, said last mentioned means comprising voltage-responsive valve means connected to respond to said resultant average voltage, a source of control current, current-responsive relay means connected to said current source for selectively actuating said motor and a speed-control equipment interposed between said relay means and said motor.

No references cited.